United States Patent
Lee

Patent Number: 6,013,989
Date of Patent: Jan. 11, 2000

[54] WIDE-BAND HORIZONTAL LINEARITY CORRECTION CIRCUIT

[75] Inventor: Ju-Hyung Lee, Kyungki-do, Rep. of Korea

[73] Assignee: SamSung Electronics Co., Ltd., Kyungki-do, Rep. of Korea

[21] Appl. No.: 09/040,301

[22] Filed: Mar. 18, 1998

Related U.S. Application Data

[63] Continuation-in-part of application No. 08/859,331, May 20, 1997.

[30] Foreign Application Priority Data

May 20, 1996 [KR] Rep. of Korea ..................... 96/16943

[51] Int. Cl.[7] .............................. H01J 29/56; G09G 1/04
[52] U.S. Cl. ........................... 315/371; 315/370; 348/806
[58] Field of Search ................................... 315/370, 371, 315/400; 348/806

[56] References Cited

U.S. PATENT DOCUMENTS

| | | |
|---|---|---|
| 3,795,835 | 3/1974 | Aldrich et al. . |
| 3,819,979 | 6/1974 | Truskalo . |
| 3,854,108 | 12/1974 | Horie et al. ............................. 335/210 |
| 3,936,719 | 2/1976 | Miyoshi et al. ......................... 326/126 |
| 3,944,879 | 3/1976 | Suzuki . |
| 3,968,402 | 7/1976 | Sahara et al. . |
| 4,099,092 | 7/1978 | Bristow . |
| 4,293,903 | 10/1981 | Mochida et al. ........................... 363/68 |
| 4,331,907 | 5/1982 | Laux et al. ............................... 315/400 |
| 4,588,930 | 5/1986 | Kobayashi et al. ...................... 315/400 |
| 4,707,640 | 11/1987 | Onozawa et al. . |
| 4,754,204 | 6/1988 | Ando et al. . |
| 4,870,329 | 9/1989 | Ara . |
| 4,945,255 | 7/1990 | Suzuki et al. ............................. 307/17 |
| 5,138,238 | 8/1992 | Truskalo . |
| 5,168,199 | 12/1992 | Huffman et al. . |
| 5,179,322 | 1/1993 | Gibbs et al. ............................. 315/370 |
| 5,268,618 | 12/1993 | Chen ....................................... 315/370 |
| 5,283,504 | 2/1994 | Chauvin et al. . |
| 5,416,389 | 5/1995 | Merlo et al. . |
| 5,420,484 | 5/1995 | Morrish . |
| 5,434,483 | 7/1995 | Yang et al. ............................. 315/371 |
| 5,434,484 | 7/1995 | Murakami . |
| 5,473,299 | 12/1995 | Tsutsumi et al. ....................... 336/110 |
| 5,475,286 | 12/1995 | Jackson et al. . |
| 5,517,090 | 5/1996 | Bando . |
| 5,777,697 | 7/1998 | Baek ....................................... 348/806 |
| 5,804,928 | 9/1998 | Endo ....................................... 315/400 |

*Primary Examiner*—Edward P. Westin
*Assistant Examiner*—Nikita Wells
*Attorney, Agent, or Firm*—Robert E. Bushnell, Esq.

[57] ABSTRACT

A wide-band horizontal linearity correction circuit includes: a primary line coil connected between a horizontal deflection yoke and an S-correction capacitor, the primary coil being wound around a first a core having a hysteresis characteristic; a secondary line coil wound around a second core adjacent the first core; a pair of permanent magnets of opposite polarities, disposed on either end of the first core; a microprocessor for supplying an analog linearity correction control signal in response to the variation of the frequency of a horizontal drive pulse signal; and a coil driver for driving the secondary line coil in response to the correction control signal supplied by the microcomputer. Accordingly, horizontal linearity can be corrected over an entire frequency band.

12 Claims, 6 Drawing Sheets

WIDE-BAND HORIZONTAL LINEARITY CORRECTION CIRCUIT

CROSS-REFERENCE TO RELATED APPLICATIONS

This application is a continuation-in-part of Applicant's Ser. No. 08/859,331, filed in the U.S. Patent & Trademark Office on May 20, 1997.

CLAIM OF PRIORITY

This application makes reference to, incorporates the same herein, and claims all benefits accruing under 35 U.S.C. §119 and §120 from an application for WIDE-BAND HORIZONTAL LINEARITY CORRECTION CIRCUIT earlier filed in the Korean Industrial Property Office on the $20^{th}$ day of May 1996 and there duly assigned Ser. No. 16943/1996, a copy of which application is annexed hereto.

BACKGROUND OF THE INVENTION

1. Field of the Invention

The present invention relates to a wide-band horizontal linearity correction circuit and, more particularly, to a correction circuit which corrects wide-band horizontal linearity in a display using hysteresis of its line transformer.

2. Description of the Related Art

A display is a computer peripheral device which exhibits a signal received from a computer as a visual image. The display includes a microprocessor for receiving a video signal, horizontal and vertical sync signals for forming a picture from a video card in a host computer to generate a control signal for controlling the display picture. The display also includes vertical and horizontal deflection circuits for receiving the horizontal and vertical sync signals and for effecting horizontal and vertical deflections so that an electron beam, generated by an electron gun of a CRT, is sequentially deflected from the upper left corner of the CRT to its lower right hand corner by a deflection yoke to thereby reproduce an image. The display also includes a high voltage circuit for supplying a high voltage to an anode of the CRT, a video pre-amplifier, a low-voltage amplifier for amplifying the video signal from the video card to maintain a predetermined voltage level and a main video amplifier for amplifying the signal from the video pre-amplifier.

With this display, images are created as the electron beam is projected onto the display fluorescent screen. The deflection circuit deflects the electron beam.

The horizontal circuit of the display includes a horizontal oscillator circuit for generating a saw-tooth wave using the charging/discharging characteristics of a capacitor, a horizontal drive circuit for amplifying the output pulse of the horizontal oscillator circuit to supply sufficient base current to turn a horizontal output transistor on and off and for performing waveform correction, a horizontal output circuit for generating a saw-tooth current signal using a deflection coil and the switching operation of the horizontal output transistor, a horizontal regulator circuit for transmitting a signal for controlling the horizontal size to the horizontal output circuit, a high voltage drive circuit for generating a high voltage which is supplied to the anode of the CRT, a high voltage output circuit for amplifying the output voltage of the high voltage drive circuit and for converting it into the driving voltage of a flyback transformer, a high voltage regulator circuit for controlling the output cycle of the high voltage output circuit, and an X-ray protection circuit for stopping the horizontal oscillator circuit when the output voltage of the flyback transformer exceeds a predetermined level.

The horizontal output circuit includes a horizontal output transistor whose base receives a horizontal drive pulse, a damper diode, a resonance capacitor, a horizontal deflection yoke, and a line coil and S-correction capacitor which are connected to the collector of the horizontal output transistor. The horizontal output transistor is switched by the horizontal drive pulse and a large amount of current is supplied to the horizontal deflection yoke through the S-correction capacitor to generate a horizontal saw-tooth current signal. In order to maintain linearity of the horizontal saw-tooth current signal according to the drive frequencies, the line coil circuit and S-correction capacitor are connected to the horizontal deflection yoke.

When the frequency of a horizontal sync signal changes, the linearity changes according to the drive frequencies so that a relay is used to connect a separate linearity correction coil in parallel with the line coil as required at different frequencies. This relay is switched on and off by a microprocessor. However, because of the high voltage and large amount of current involved, the relay must be substantial so as to be able to handle the high current and voltage. Furthermore, noise is created when the relay is switched. In addition, the linearity properties depend on the deviation of the linearity correction coil and the horizontal deflection yoke.

The patents to Suzuki, Sahara et al., Truskalo, Gibbs et al., and Yang et al., U.S. Pat. Nos. 3,944,879, 3,968,402, 5,138,238, 5,179,322 and 5,434,483, respectively entitled Pin Cushion Distortion Correction Circuit, Raster Distortion Correcting Circuit, Arrangement For Correcting Beam Landing Location Error In A Video Display, Linearity Correction Apparatus, and Automatic Compensation Circuit For The Horizontal Deflection Of A Multifrequency Computer Monitor, each disclose correction circuits utilizing transformers connected in series with the horizontal deflection yoke and S-correction capacitor. However, none of these references teaches or suggests the use of a microprocessor for supplying a linearity correction control signal to a coil driver driving such a transformer as in the present invention.

The Jackson et al. patent, U.S. Pat. No. 5,475,286, entitled Deflection Waveform Correction Circuit, discloses an S-correction circuit rather than the horizontal linearity circuit of the present invention.

The Ando et al. and Bando patents, U.S. Pat. Nos. 4,754,204 and 5,517,090, respectively entitled Digital Apparatus For Convergence Correction, and S-Correction Capacitor Switching For A Display Monitor, disclose correction circuits utilizing digital processors for generating correction signals. However, Ando et al. utilizes a correction coil which is separate from the deflection coil while Bando varies the value of the S-correction capacitor rather than the inductance of the series circuit consisting of the horizontal deflection coil and S-correction capacitor.

The following additional patents each disclose features in common with the present invention but are not as pertinent as the patents discussed in detail above: U.S. Pat. No. 5,434,484 to Murakami, entitled Raster Left-And Right Distortions Correcting Apparatus, U.S. Pat. No. 4,870,329 to Ara, entitled Digital Convergence Circuit Storing Coefficients Of Fundamental Waves Of Correction Data, U.S. Pat. No. 3,854,108 to Horie et al., entitled Apparatus For Compensation Of Right And Left Pincushion Distortion, U.S. Pat. No. 3,819,979 to Truskalo, entitled High Voltage Regulators, U.S. Pat. No. 3,795,835 to Aldrich et al., entitled Horizontal Linearity Correction Circuit, U.S. Pat. No. 4,099,092 to Brinstow, entitled Television display Alignment System And Method, U.S. Pat. No. 4,707,640 to Onozawa et al., entitled Horizontal Deflection Output Circuit, U.S. Pat. No. 5,283,504 to Chauvin et al., entitled Grid Correction Circuit For TV Sets, U.S. Pat. No. 5,268,618 to Chen, entitled Linearity Compensation Method And Variable Magnetic Field Strength Linearity Compensation Apparatus For A Multi-Scanning Monitor, U.S. Pat. No. 5,420,484 to Morrish, entitled Deflection Apparatus For Raster Scanned CRT Displays, U.S. Pat. No. 5,416,389 to Merlo et al, entitled Horizontal Deflection Stage Linearity Control Device, U.S. Pat. No. 5,473,299 to Tsutsumi et al., entitled Horizontal Linearity Correction Coil, and U.S. Pat. No. 5,168,199 to Huffman et al., entitled Horizontal Linearity Correction Circuitry For Cathode Ray Tube Display.

SUMMARY OF THE INVENTION

An object of the present invention is to provide a wide-band horizontal linearity correction circuit which corrects wide-band linearity using the hysteresis characteristic of a line transformer.

To accomplish the object of the present invention, there is provided a wide-band horizontal linearity correction circuit including: a primary line coil connected in series with horizontal deflection yoke and an S-correction capacitor, the coil being wound around a first core having a hysteresis characteristic; a secondary line coil wound around a second core adjacent the first core; a pair of permanent magnets of opposite polarities, disposed on either end of the first core; a microprocessor for supplying an analog linearity correction control signal in response to the variation of the frequency of a horizontal driving pulse signal; and a coil driver for driving the secondary line coil in response to the analog linearity correction control signal supplied from the microprocessor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
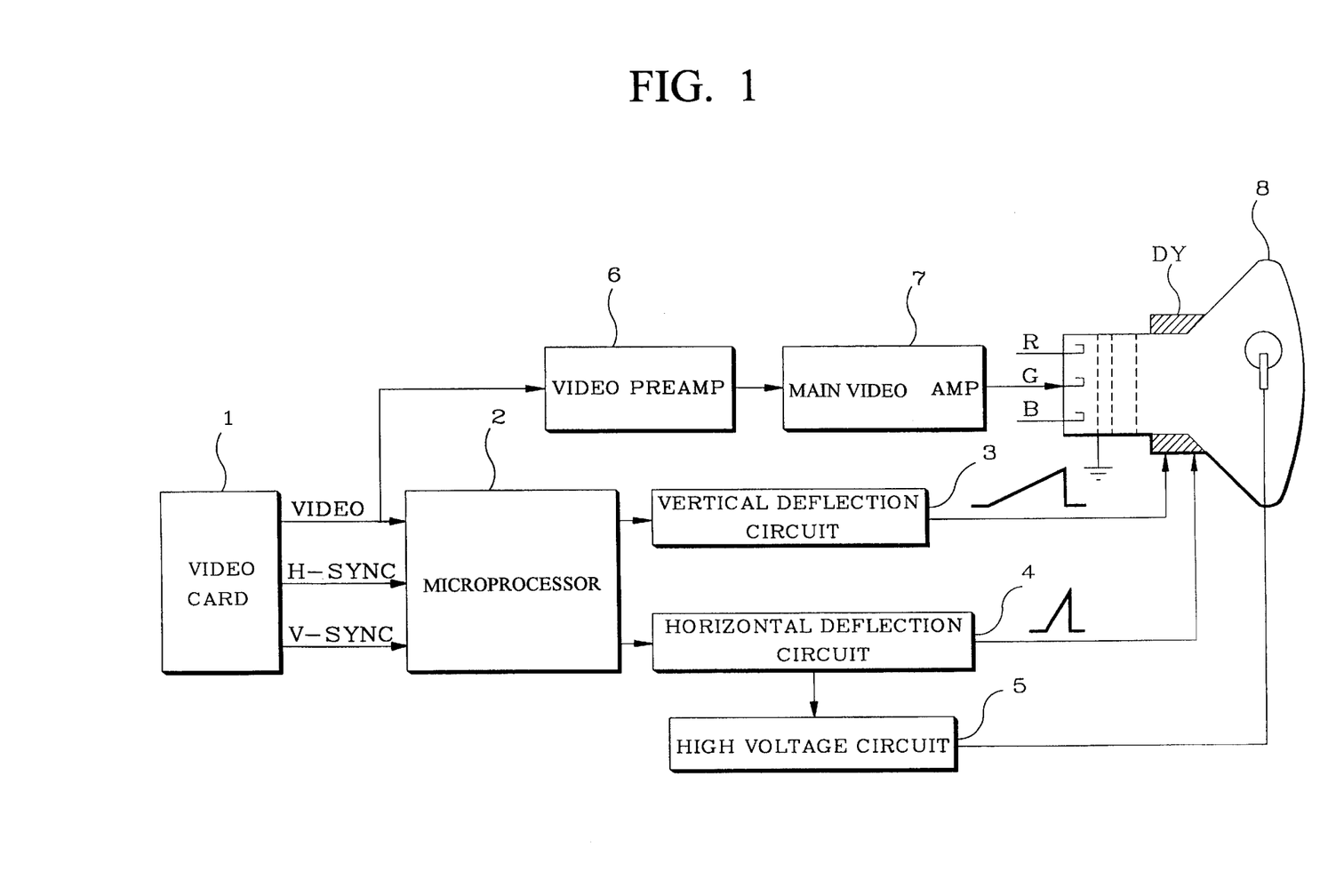
FIG. 1 is a block diagram of a display.

A display is a computer peripheral device, which exhibits a signal received from a computer as a visual image, that a user can understand. FIG. 1 is a block diagram of the internal circuit of an earlier display. Referring to FIG. 1, the display includes a microprocessor 2 for receiving a video signal (R,G,B), horizontal and vertical sync signals, (H-Sync and V-Sync), required for forming a picture from a video card 1 in a host computer (not shown), to generate a control signal for controlling the display picture. The display also includes vertical and horizontal deflection circuits 3 and 4, for receiving the horizontal and vertical sync signals, and for effecting horizontal and vertical deflections so that an electron beam, generated by an electron gun of a CRT 8, is sequentially deflected from the upper left corner of the CRT 8 to its lower right corner by a deflection yoke, to thereby reproduce an image such as a photograph. The display also includes a high voltage circuit 5, for supplying a high voltage to an anode of CRT 8 using a retrace line pulse generated by the output of horizontal deflection circuit 4 according to the properties of a high voltage switching circuit; a video pre-amplifier 6, a low-voltage amplifier for amplifying the video signal (R,G,B) from the video card 1 to maintain a predetermined voltage level; and a main video amplifier 7 for amplifying the signal from video pre-amplifier 6 to a signal of 40 to 60 Vpp, thus supplying energy to each pixel of the display.

With this display, images are created as the electron beam is projected onto the display fluorescent screen. The deflection circuit deflects the electron beam. The deflection phenomena used in the deflection circuit is divided into electrostatic deflection using an electric field, and electromagnetic deflection, using a magnetic field. With a television, electromagnetic deflection is used; thus, a saw-tooth current signal is supplied to horizontal and vertical deflection yokes to scan a picture.

Figure 2:
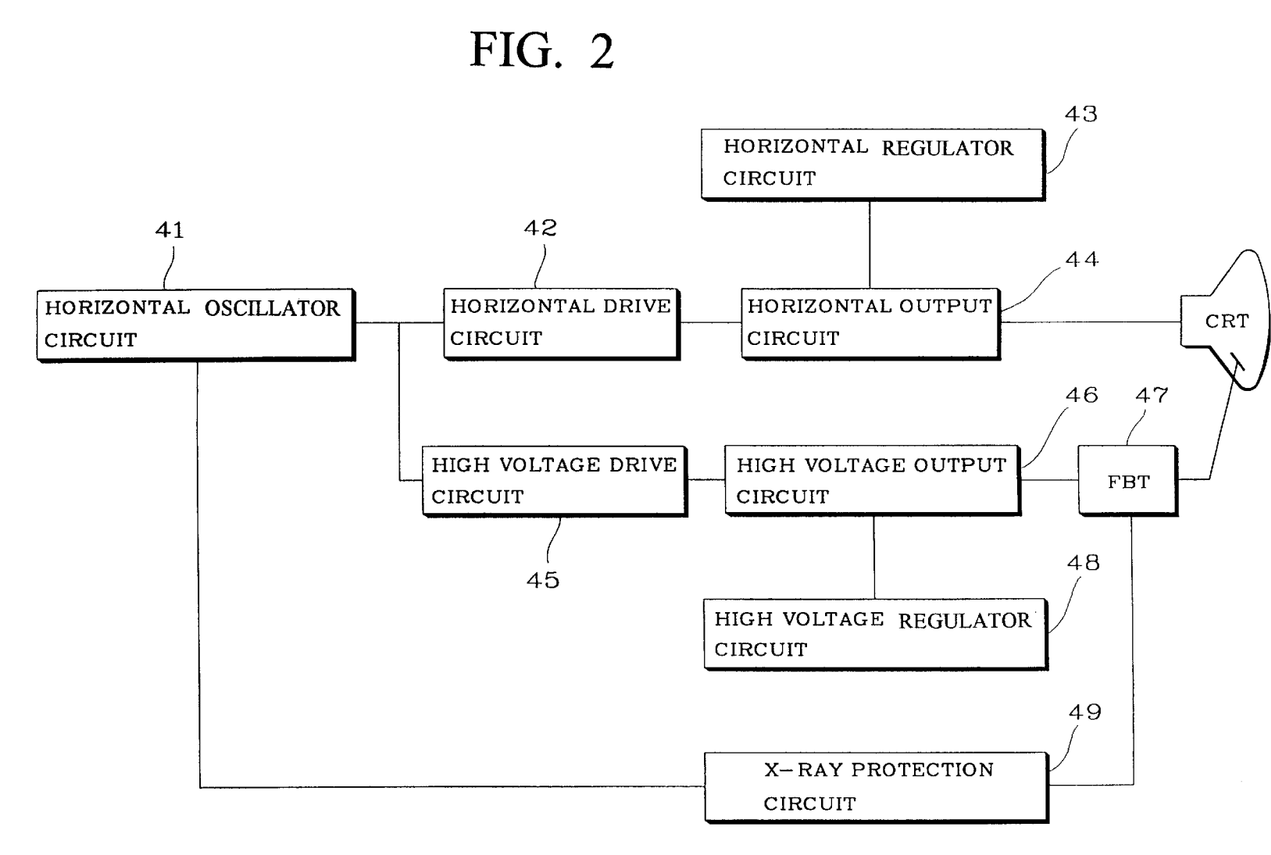
FIG. 2 is a block diagram of the horizontal circuit of the display of FIG. 1.

FIG. 2 is a block diagram of the horizontal circuit of the display. Referring to FIG. 2, the horizontal circuit includes a horizontal oscillator circuit 41, for generating a saw-tooth wave using the charging/discharging characteristics of a capacitor, to generate the signal using the power from a power supply which converts an AC voltage supplied thereto into a DC voltage output; a horizontal drive circuit 42 for amplifying the output pulse of the horizontal oscillator circuit 41 to supply enough base current to turn a horizontal output transistor on or off, and for performing waveform correction; a horizontal output circuit 44, for generating a saw-tooth current signal using a deflection coil and the switching operation of the horizontal output transistor, which operates by receiving sufficient current from the horizontal drive circuit 42; a horizontal regulator circuit 43, for transmitting a signal for controlling the horizontal size to the horizontal output circuit 44; a high voltage drive circuit 45 for generating a high voltage which is supplied to the anode of a CRT using the oscillator frequency of the horizontal oscillation circuit 41; a high voltage output circuit 46 for amplifying the output voltage of the high voltage drive circuit 45, and for converting it into the driving voltage of a flyback transformer FBT 47; a high voltage regulator circuit 48 for controlling the output cycle of the high voltage output circuit 46; and an X-ray protection circuit 49 for stopping the horizontal oscillator circuit 41 when the output voltage of the FBT 47 exceeds a predetermined level.

Figure 3:
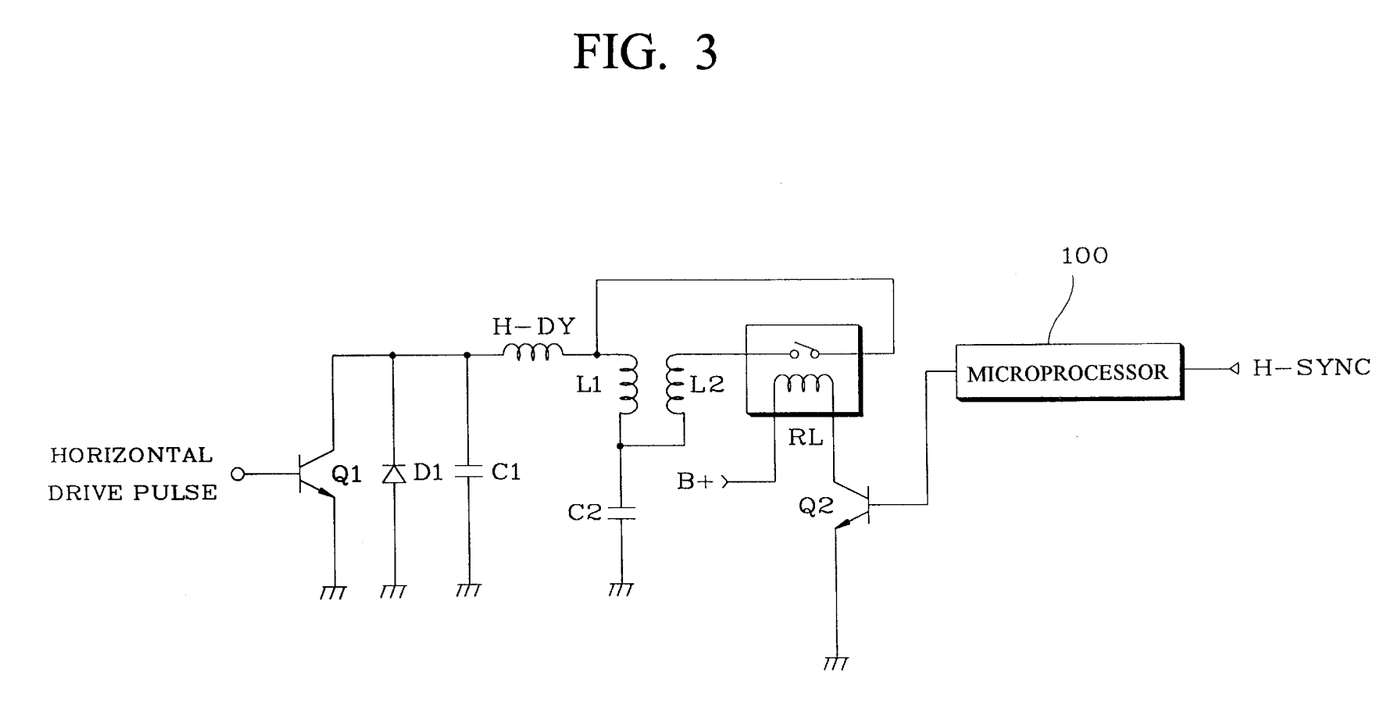
FIG. 3 is a circuit diagram of the horizontal output circuit of the horizontal circuit of FIG. 2.

FIG. 3 shows the configuration of the horizontal output circuit 44 of FIG. 2. Referring to FIG. 3, the horizontal output circuit includes: a horizontal output transistor Q1 whose base receives a horizontal drive pulse; a damper diode D1; a resonance capacitor Cl; a horizontal deflection yoke H-DY; and a line coil L1 and an S-correction capacitor C2, which are connected to the collector of the horizontal output transistor Q1. The horizontal output transistor Q1 is switched by the horizontal drive pulse, and a large amount of current and a high voltage are supplied to horizontal deflection yoke H-DY through the capacitor C2, to generate a horizontal saw-tooth current signal. In order to maintain the linearity of the horizontal saw-tooth current signal according to the drive frequencies, the line coil circuit L1 and S-correction capacitor C2 are connected to the horizontal deflection yoke H-DY.

When the frequency of a horizontal sync signal changes, that is, when the frequency of the horizontal drive pulse signal supplied to the base of transistor Q1 changes, the linearity changes according to the drive frequencies, so that a relay RL is used to connect a separate linearity correction coil L2 as required at different frequencies. This relay is switched by a microprocessor 100. However, because of the high voltage and large amount of current, the relay must be able to handle the current and voltage. Furthermore, noise is created when the relay is switched. Moreover, the linearity properties depend on the deviations of the linearity correction coil and the horizontal deflection yoke.

Reference will now be made in detail to the preferred embodiment of the present invention, examples of which are illustrated in the accompanying drawings.

Figure 4:
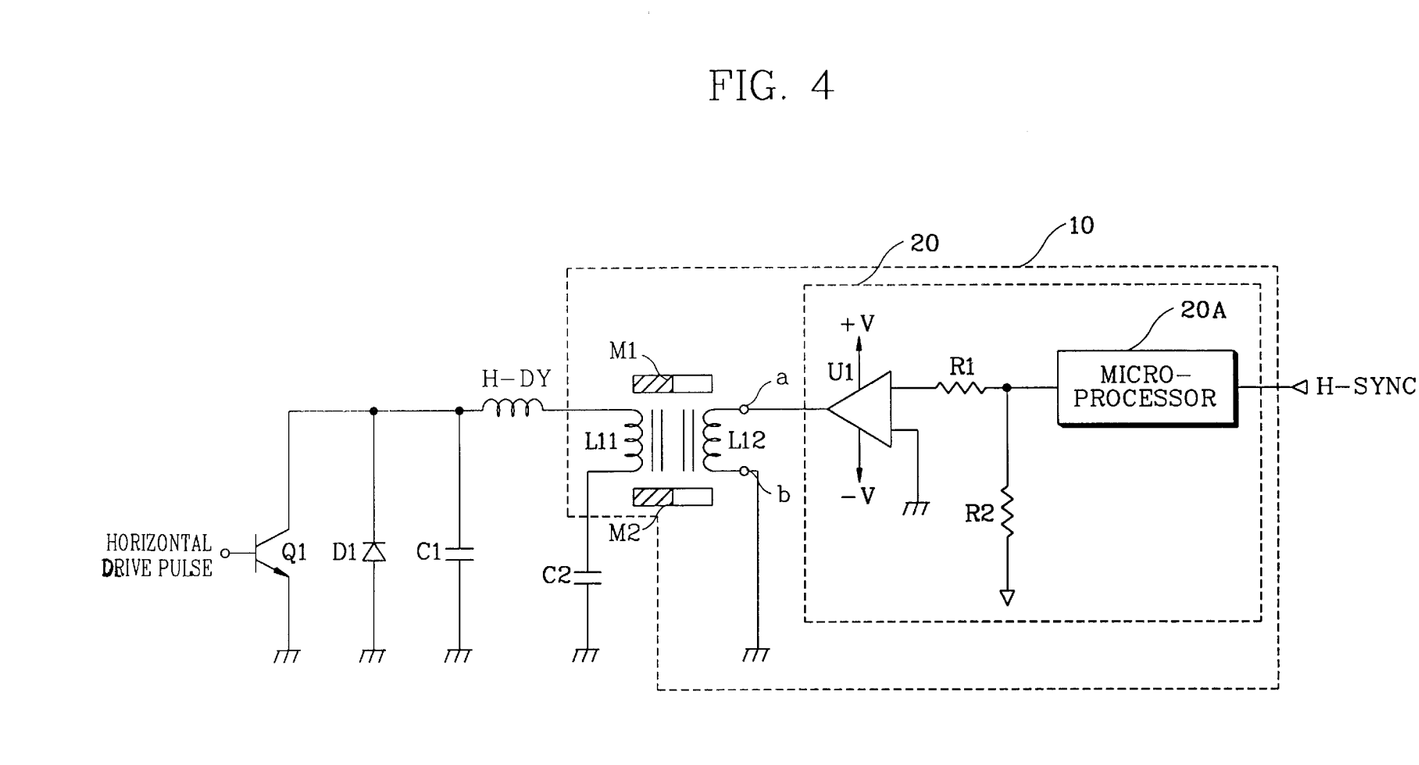
FIG. 4 is a circuit diagram of a horizontal output circuit including a wide-band horizontal linearity correction circuit according to the present invention.

FIG. 4 shows the configuration of a horizontal output circuit including a wide-band horizontal linearity correction circuit according to the present invention. Referring to FIG. 4, the horizontal output circuit includes: a horizontal output transistor Q1 in which the base receives a horizontal drive pulse signal, the emitter is grounded and the collector receives a drive voltage; a damper diode and resonance capacitor C1 which are connected between transistor Q1 and ground; and a horizontal deflection yoke H-DY, line coil circuit 10 and S-correction capacitor C2, which are connected in series between the collector and ground.

Figure 5A:
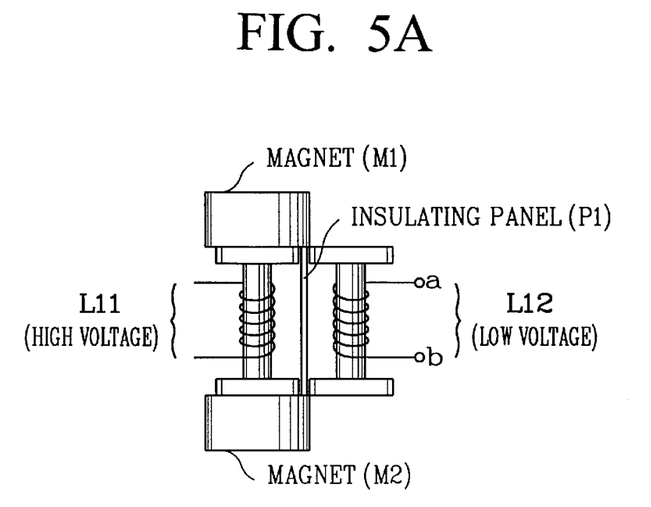
FIGS. 5A–5B show the configuration of a line transformer of the circuit of FIG. 4.
Figure 5B:
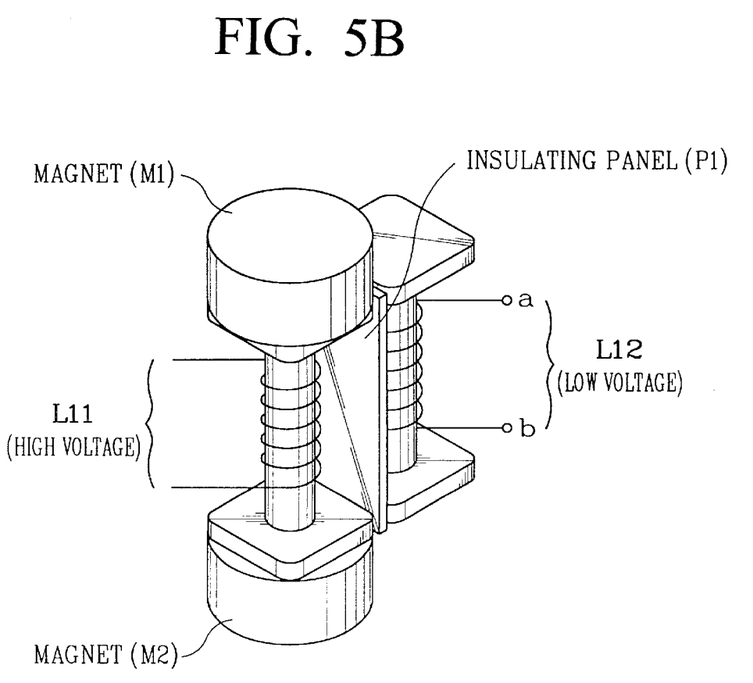
Figure 6:
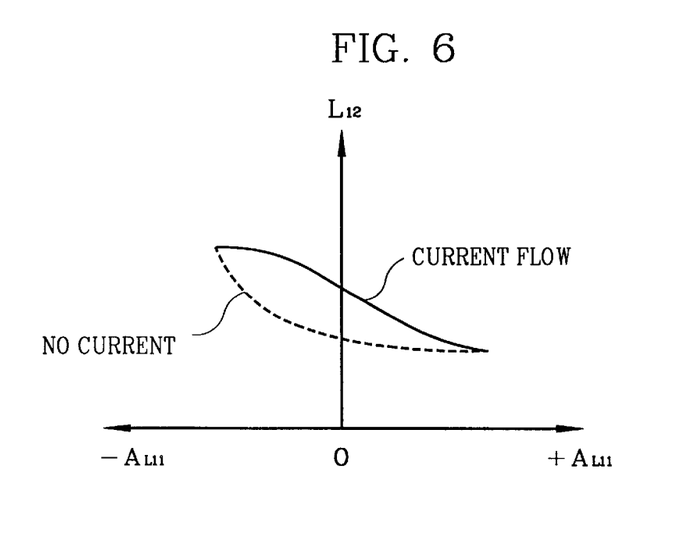
FIG. 6 is a graph showing a characteristic curve of the current flowing through a secondary coil of the line transformer of FIG. 4.

A line coil circuit 10 is connected between the horizontal deflection yoke H-DY and the S-correction capacitor C2. The configuration of line coil circuit 10 is shown in FIGS. 5A–5B. Referring to FIGS. 5A–5B, the line coil circuit includes the primary line coil L11 wound around a first core of the line transformer, a secondary line coil L12, wound around a second core adjacent to the first core, and a coil driver 20 driving secondary line coil L12 in response to a linearity correction control signal which responds to frequency variations of the horizontal driving pulse signal. A thin insulating panel P1 is disposed between primary and secondary side cores to effect core electrical isolation without impeding the electromagnetic field, for example, a thin piece of plastic. The coil driver 20 includes a microprocessor 20A having an internal D/A converter and an amplifier U1. The D/A converter may also be external to the microprocessor 20A. A pair of magnets M1 and M2 are respectively attached to either end of the primary side first core to enhance sensitivity while maintaining a high degree of linearity as shown in FIG. 6.

The microprocessor 20A stores data which maintains the linearity in response to the hysteresis curve of the line transformer over the entire band of horizontal frequencies to be corrected, checks the frequency of the horizontal sync signal to read the data value stored in a corresponding address, and outputs a linearity correction control signal having a predetermined DC voltage level, for example, −2.5 V to +2.5 V, corresponding to digital data fed to the internal D/A converter thereof. The amplifier U1 creates a driving current signal which varies to a positive or negative level, to drive secondary line coil L12. A driving current from +A to 0 of FIG. 6 flows through the secondary coil when current flows from node a to node b of FIGS. 4–5B, and driving current from 0 to −A flows through the secondary coil when current flows from node b to node a, to induce a current in response to the hysteresis curve of the core to primary line coil L11. The inductance value of the line coil varies according to frequency.

Figure 7A:
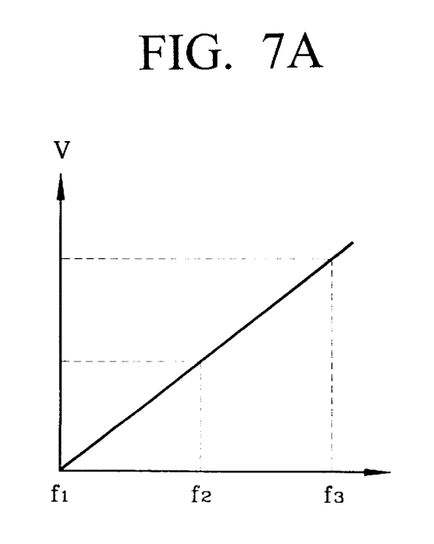
FIG. 7A shows the output voltage of the internal D/A converter of the microprocessor 20A of FIG. 4.
Figure 7B:
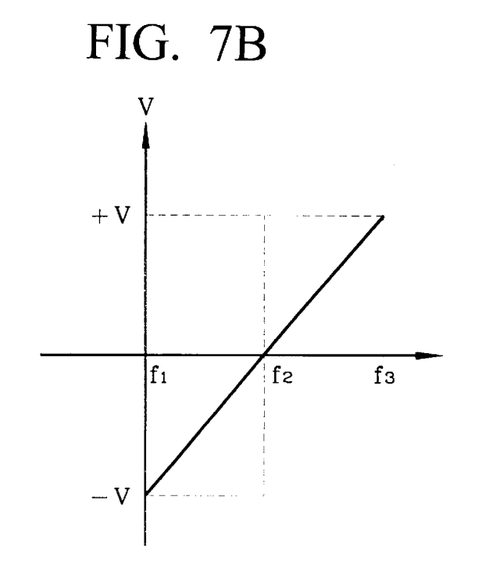
FIG. 7B shows the output of coil driver 20 of FIG. 4.

FIG. 7A shows the output voltage of the internal D/A converter of microprocessor 20A over frequency while FIG. 7B shows the output voltage of coil drive 20 with respect to its own driving voltages, that is +V and −V.

According to the present invention, when the linearity correction control signal in response to the frequency of the horizontal sync signal is supplied to the line coil circuit, the inductance value of the line coil circuit is changed to accurately correct the linearity over the entire frequency band. Furthermore, since the microprocessor supplies the correction control signal, an accurate correction control signal corresponding to the deviation of the horizontal deflection yoke can be easily created.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A wide-band horizontal linearity correction circuit comprising:

a primary line coil connected in series with a horizontal deflection yoke and an S-correction capacitor, the primary coil being wound around first a core having a hysteresis characteristic;

a secondary line coil wound around a second core adjacent said first core;

a pair of permanent magnets of opposite polarities, respectively disposed on either end of said first core;

a microprocessor and a digital to analog converter for supplying an analog linearity correction control signal in response to a variation of the frequency of a horizontal drive pulse signal; and a coil driver amplifier, having an input connected to an output of the digital to analog converter via a resistance voltage divider, for driving the secondary line coil in response to the analog linearity correction control signal supplied by the microprocessor.

2. In a horizontal output circuit having a horizontal deflection yoke in series with an S-correction capacitor, a wide-band horizontal linearity correction circuit comprising:

a line transformer having hysteresis and comprising primary and secondary line coils, the primary line coil being connected in series with the horizontal deflection yoke and S-correction capacitor, the primary and secondary line coils being respectively wound around first and second adjacent cores of the transformer and a pair of permanent magnets of opposite polarities being respectively disposed on either end of said first core;

a microprocessor and a digital to analog converter for supplying an analog linearity correction control signal in response to a variation of the frequency of a horizontal drive pulse signal;

a coil driver amplifier, having an input connected to an output of the digital to analog converter via a resistance voltage divider, and having an output connected to the secondary line coil for driving the secondary line coil in response to the analog linearity correction control signal supplied by the microprocessor.

3. The correction circuit of claim 1, further comprising an electrically insulating panel disposed between said first and second coils.

4. The correction circuit of claim 2, further comprising an electrically insulating panel disposed between said first and second coils.

5. The correction circuit of claim 3, said insulating panel comprising a thin plastic material.

6. The correction circuit of claim 4, said insulating panel comprising a thin plastic material.

7. The correction circuit of claim 1, said resistance voltage divider comprising first and second resistors connected in series between said input of said coil driver amplifier and ground, said output of the digital to analog converter being connected to a junction between said first and second resistors.

8. The correction circuit of claim 2, said resistance voltage divider comprising first and second resistors connected in series between said input of said coil driver amplifier and ground, said output of the digital to analog converter being connected to a junction between said first and second resistors.

9. The correction circuit of claim 3, said resistance voltage divider comprising first and second resistors connected in series between said input of said coil driver amplifier and ground, said output of the digital to analog converter being connected to a junction between said first and second resistors.

10. The correction circuit of claim 4, said resistance voltage divider comprising first and second resistors connected in series between said input of said coil driver amplifier and ground, said output of the digital to analog converter being connected to a junction between said first and second resistors.

11. The correction circuit of claim 5, said resistance voltage divider comprising first and second resistors connected in series between said input of said coil driver amplifier and ground, said output of the digital to analog converter being connected to a junction between said first and second resistors.

12. The correction circuit of claim 6, said resistance voltage divider comprising first and second resistors connected in series between said input of said coil driver amplifier and ground, said output of the digital to analog converter being connected to a junction between said first and second resistors.

* * * * *